US009674039B2

(12) United States Patent
Yang

(10) Patent No.: US 9,674,039 B2
(45) Date of Patent: Jun. 6, 2017

(54) METHOD AND DEVICE FOR MANAGING NETWORK ACCELERATION SOFTWARE

(71) Applicant: TENCENT TECHNOLOGY (SHENZHEN) COMPANY LIMITED, Shenzhen (CN)

(72) Inventor: Jing Yang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 95 days.

(21) Appl. No.: 14/442,107

(22) PCT Filed: Oct. 22, 2013

(86) PCT No.: PCT/CN2013/085649
§ 371 (c)(1),
(2) Date: May 12, 2015

(87) PCT Pub. No.: WO2014/075539
PCT Pub. Date: May 22, 2014

(65) Prior Publication Data
US 2016/0294610 A1    Oct. 6, 2016

(30) Foreign Application Priority Data
Nov. 15, 2012 (CN) .......................... 2012 1 0458711

(51) Int. Cl.
*H04L 12/841* (2013.01)
*H04L 12/24* (2006.01)
(Continued)

(52) U.S. Cl.
CPC .............. *H04L 41/083* (2013.01); *G06F 8/62* (2013.01); *G06F 11/1464* (2013.01);
(Continued)

(58) Field of Classification Search
CPC ........................... H04L 47/283; H04L 41/083
See application file for complete search history.

(56) References Cited

U.S. PATENT DOCUMENTS 8,228,861 B1* 7/2012 Nix ........................ H04W 36/00
370/329
2004/0153534 A1* 8/2004 Gibart ....................... H04L 69/40
709/223
(Continued)

FOREIGN PATENT DOCUMENTS

CN             1777126 A        5/2006
CN          101883003 A        11/2010
(Continued)

OTHER PUBLICATIONS

Office Action in CN Application No. 201210458711.4 dated Oct. 8, 2014, 5 pages (English language concise statement of relevance attached).
(Continued)

*Primary Examiner* — Arvin Eskandarnia
(74) *Attorney, Agent, or Firm* — Marshall, Gerstein & Borun LLP

(57) ABSTRACT

A method for managing network acceleration software includes the following: obtaining a value of network delay of the computing device and determining whether the value of the network delay exceeds a preset threshold; backing up network acceleration settings upon the condition that the value of network delay exceeds the preset threshold, the network acceleration settings comprising all network acceleration software installed; closing at least one network acceleration software installed; determining the at least one network acceleration software is at question if the value of the network delay does not exceed the preset threshold after the at least one network acceleration software is closed. Further, a computing device for managing network acceleration software is also disclosed.

13 Claims, 4 Drawing Sheets

(51) Int. Cl.
*H04L 12/26* (2006.01)
*G06F 9/445* (2006.01)
*G06F 11/14* (2006.01)

(52) U.S. Cl.
CPC ...... *H04L 41/0816* (2013.01); *H04L 43/0852* (2013.01); *H04L 43/16* (2013.01)

(56) References Cited

U.S. PATENT DOCUMENTS

| | | |
|---|---|---|
| 2005/0114562 A1 | 5/2005 | Barnes et al. |
| 2012/0069747 A1 | 3/2012 | Wang et al. |
| 2012/0166636 A1 | 6/2012 | Page et al. |

FOREIGN PATENT DOCUMENTS

| | | |
|---|---|---|
| CN | 102306095 A | 1/2012 |
| CN | 102307224 A | 1/2012 |

OTHER PUBLICATIONS

Search Report and Written Opinion in International Application No. PCT/CN2013/085649 dated Jan. 23, 2014.

\* cited by examiner

METHOD AND DEVICE FOR MANAGING NETWORK ACCELERATION SOFTWARE

PRIORITY STATEMENT

The application claims the benefit of Chinese Patent Application No. 201210458711.4, filed on Nov. 15, 2012, the disclosure of which is incorporated herein in its entirety by reference.

FIELD

The present disclosure relates to Internet technology, particularly to a method and device for managing network acceleration software.

BACKGROUND

In recent days, a big problem affecting the experience of online game users is that the network is often stuck while the users are playing online games. And the main reason of the network being stuck is that network delay between an online game client and an online game server is too big. To reduce the network delay, most of major game operators as well as many third-party companies have launched their own network acceleration software. The network acceleration software can build a bridge between the online game client and the online game server, forward network data, so as to speed up the data transmission between the online game client and the online game server.

With the increase in the number of this kind of network acceleration software, a user may have installed more than one network acceleration software on his network device. Since the quality of this kind of software is not guaranteed, in some circumstance, the network will become more stuck when using network acceleration software. And emerge of malicious network acceleration software or bad network acceleration software (also known as network hijacking software), which hijack packets of the user and steal private information of the user at the same time, makes things even worse.

SUMMARY

According to an example of the present disclosure, a method for managing network acceleration software is provided. The method includes: obtain a value of network delay of the computing device and determining whether the value of the network delay exceeds a preset threshold; backing up network acceleration settings upon the condition that the value of the network delay exceeds the present threshold, the network acceleration settings including all network acceleration software installed; closing at least one network acceleration software; and determining that the at least one network acceleration software is at question if the value of the network delay does not exceed the preset threshold after the at least one network acceleration software is closed.

According to still another example of the present disclosure, a computing device for managing network acceleration software is provided. The computing device includes: one or more processors; a memory; and one or more programs stored in the memory and to be executed by the one or more processors, the one or more programs include instructions to: obtain a value of network delay of the computing device and determine whether the value of the network delay exceeds a preset threshold; back up network acceleration settings upon the condition that the value of the network delay exceeds the preset threshold, the network acceleration settings including all network acceleration software installed; close at least one network acceleration software; determine the at least one network acceleration software is at question if the value of the network delay does not exceed the preset threshold after the at least one network acceleration software is closed.

According to yet another example of the present disclosure, a non-transitory computer-readable storage medium is provided. The storage medium includes a set of instructions for managing network acceleration software, the set of instructions to direct at least one processor to perform acts of: obtaining a value of network delay of the computing device and determining whether the value of the network delay exceeds the preset threshold; backing up network acceleration settings upon the condition that the value of the network delay exceeds the preset threshold, the network acceleration settings including all network acceleration software installed; closing at least one network acceleration software; and determining that the at least one network acceleration software is at question if the value of the network delay does not exceed the preset threshold after the at least one network acceleration software is closed.

Other aspects or embodiments of the present disclosure can be understood by those skilled in the art in light of the description, the claims, and the drawings of the present disclosure.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Figure 1:
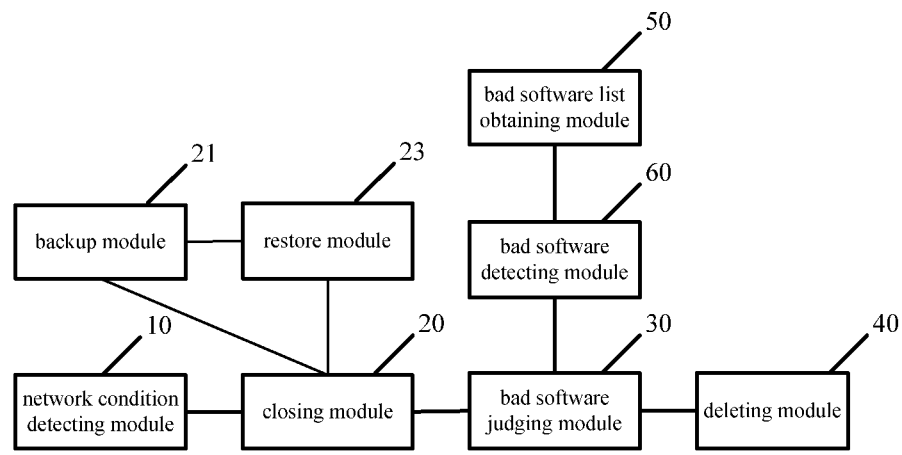
FIG. 1 is a schematic diagram illustrating a structure of a computing device for managing network acceleration software according to an example of the present disclosure.
Figure 2:
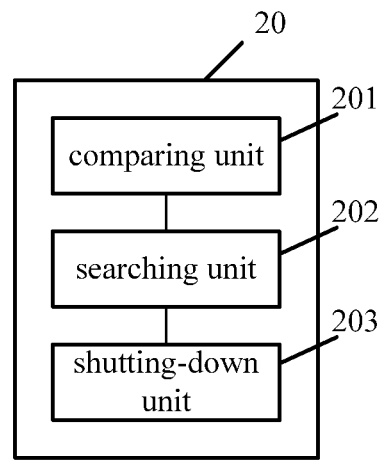
FIG. 2 is a schematic diagram illustrating a structure of a closing module 20 of the computing device for managing network acceleration software according to an example of the present disclosure.

FIG. 1 is a schematic diagram illustrating the structure of a computing device for managing network acceleration software according to an example of the present disclosure. The computing device for managing network acceleration software (hereinafter named as "computing device") can be implemented in any computing device with a network function, such as a personal computer (PC), a tablet PC, an intelligent TV terminal, a smart phone, an electronic reader, a laptop, and a vehicle terminal.

As illustrated in FIG. 1, the computing device may include at least the following modules: a network condition detecting module 10, a closing module 20 and a bad software judging module 30.

The network condition detecting module 10 is to obtain a value of network delay of the computing device, determine whether the value of network delay exceeds a preset threshold. Specifically, the network delay can be the network delay between the computing device and a server, such as a corresponding online game server. The preset threshold can be set by the server or a user of the computing device. The preset threshold can also be set as a sum of a preset value and a normal network delay between the computing device and the server which may be buffered by the computing device. For example, if the normal network delay between the computing device and the server buffered by the computing device is 60 ms and the preset value is 50 ms, the preset threshold would beset as 110 ms.

The closing module 20 is to close at least one network acceleration software if the value of the network delay exceeds the preset threshold. And the closing module 20 is further to trigger the network condition detecting module 10 to determine whether the value of the network delay still exceeds the preset threshold after closing at least one network acceleration software. Specifically, the closing module 20 can close one or more network acceleration software according to network acceleration settings of the computing device. The network acceleration settings of a computing device may include a network acceleration software list recording all network acceleration software installed on the computing device. And the closing module 20 may trigger the network condition detecting module 10 to determine whether the value of the network delay exceeds the preset threshold after closing the one or more network acceleration software.

The bad software judging module 30 is to determine the at least one network acceleration software is at question if the value of the network delay does not exceed the preset threshold after the at least one network acceleration software is closed. It can be concluded that if the value of the network delay exceeds the preset threshold before the at least one network acceleration software is closed, but the value of the network delay does not exceed the preset threshold after the at least one network acceleration software is closed, it means that the at least one network acceleration software closed can be determined as bad or malicious software. According to an example of the present disclosure, malicious network acceleration software or bad network acceleration software is network acceleration software which would slow down speed of the network rather than accelerate the speed of the network, such as network hijacking software, which hijack packets of the user and/or steal private information of the user.

The bad software judging module 30 may further notify the user when determining the at least one network acceleration software is at question and ask the user whether to delete the at least one network acceleration software.

According to an example of the present disclosure, the closing module 20 may include a comparing unit 201, a searching unit 202 and a closing unit 203.

The comparing unit 201 is to compare current network accelerating settings with the backed-up network acceleration settings adopting which the value of the network delay did not exceed the preset threshold.

The searching unit 202 is to find newly installed network acceleration software which is installed after the backed up network acceleration settings were backed up.

The closing unit 203 is to close at least one of the newly installed network acceleration software.

According to an example of the present disclosure, the computing device for managing network acceleration software may further include a backup module 21.

The backup module 21 is to back up network acceleration settings before the at least one network acceleration software is closed. As stated above, the network acceleration settings includes a network acceleration software list recording all network acceleration software installed on the computing device. According to an example of the present disclosure, the backup module 21 can back up the network acceleration settings when the network condition detecting module 10 determines that the value of the network delay exceeds the preset threshold. The backup module 21 may also back up the network acceleration settings according to an instruction of the user or back up the network acceleration settings periodically.

The content backed-up by the backup module 21 may include time of the backup operation and network acceleration software installed at the time of the backup operation. The network acceleration software installed may be identified by its software ID, such as signature and/or path of the network acceleration software. After the backup operation, a network acceleration software list recording all network acceleration software installed would be saved. Thus the computing device for managing the network acceleration software may restore the network acceleration settings of a previous moment according to the requirement of the user in the future.

According to an example of the present disclosure, the computing device for managing network acceleration software may further include a restore module 23.

The restore module 23 is to restore the backed-up network acceleration settings if the value of the network delay exceeds the preset threshold after the at least one network acceleration software is closed. According an example of the present disclosure, the restore module 23 would run all the network acceleration software in the network acceleration software list to restore the backed-up network acceleration settings. It should be noted that the restore module 23 may be further adapted to restore the backed-up network acceleration settings if the value of the network delay does not exceed the preset threshold after the at least one network acceleration software is closed. That is, no matter whether the value of the network delay exceeds the preset threshold or not, the restore module 23 can restore the network acceleration settings backed-up before, so as to detect all network acceleration software individually. After the network acceleration settings are restored, the restore module 23 can trigger the closing module 20 continues to close at least one of other network acceleration software recorded in the network acceleration software list. For example, the network acceleration software list may include software A, B and C, and the computing device closes software A to check whether software A is at question. In this example, after checking software A, the restore module 23 may restore backed-up network acceleration settings no matter whether software A is at question. And then the computing device may close software B to check whether software B is at question. And after checking software B, the restore module 23 may restore backed-up network acceleration settings again no matter whether software B is at question. And then the computing device may close software C this time to check whether software C is at question. Thus software A, B and C is checked individually.

According to another example of the present disclosure, the computing device for managing network acceleration software may further include a deleting module 40, which is adapted to delete the at least one network acceleration software according to an instruction from a user of the computing device. Specifically, the deleting module 40 may further trigger the backup module 21 to back up the network acceleration settings before deleting the at least one network acceleration software which is determined to be at question. Thus the network acceleration settings can be restored to the state before the deletion of the at least one network acceleration software in the future.

According to still another example of the present disclosure, the computing device for managing network acceleration software may further include a bad software list obtaining module 50 and a bad software detecting module 60.

The bad software list obtaining module 50 is to obtain a bad network acceleration software list from the server. Specifically, the bad network acceleration software list may include software IDs (such as the signature and/or the path of the network acceleration software) of a plurality of network acceleration software pushed in different network segment or in different times by the server.

The bad software detecting module 60 is to determine one of the network acceleration software installed is at question if the one of the network acceleration software installed is in the bad network acceleration software list. Specifically, the bad software detecting module 60 may match each of the network acceleration software installed with the bad network acceleration software list obtained from the server. For example, regarding each of the network acceleration software, the bad software detecting module 60 may judge whether the signature and/or the path of the network acceleration software is in the bad network acceleration software list or not. If the signature and/or the path of the network acceleration software is in the bad network acceleration software list, the bad software detecting module 60 may determine that the network acceleration software is at question.

According to an example of the present disclosure, the computing device may further store the value of the network delay before the at least one network acceleration software is closed and calculate the difference between current network delay and the stored network delay after the at least one network acceleration software is closed. And the computing device may restore the backed-up network setting at any time to check other network acceleration software installed. If all the individual network acceleration software and all the combination of the network acceleration software have been checked, and no bad network acceleration software has been detected, it means that the network delay may have nothing to do with the network acceleration software installed.

Hereinafter, a method for managing the network acceleration software will be described in detail.

Figure 3:
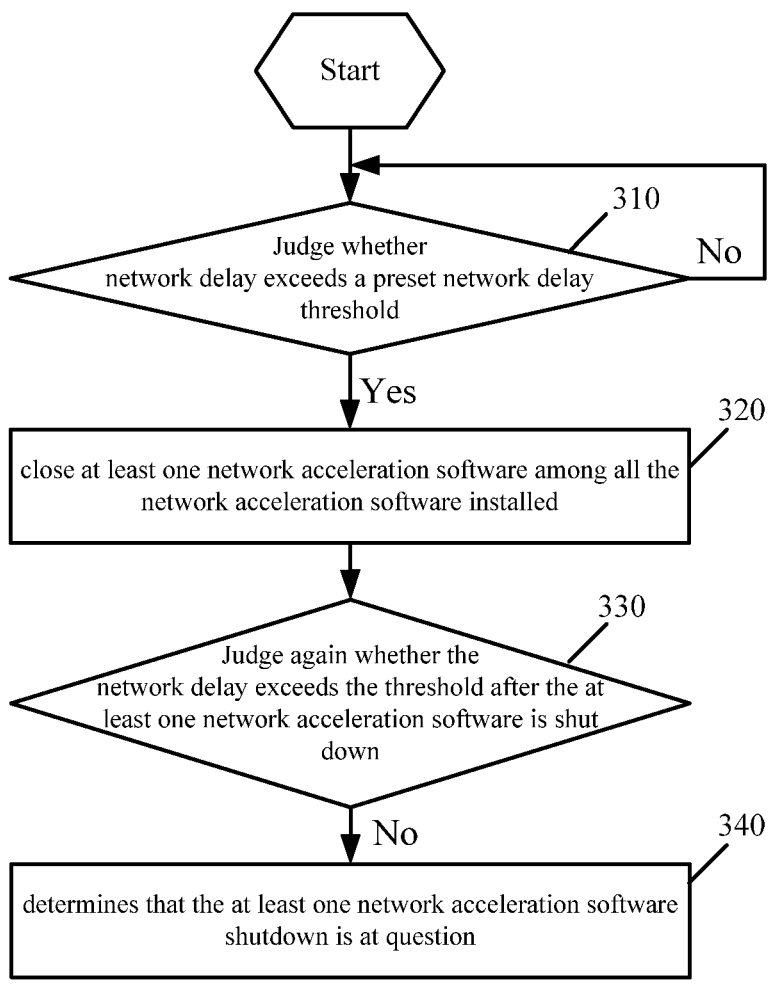
FIG. 3 is a flow chart illustrating the process of a method for managing network acceleration software according to an example of the present disclosure.

FIG. 3 is a flowchart illustrating the process of a method for managing the network acceleration software according to an example of the present disclosure. As illustrated in FIG. 3, the method includes the following steps.

In block S310, the computing device obtains a value of network delay of the computing device and judges whether the value of the network delay exceeds a preset threshold. Specifically, the value of the network delay can be the value of the network delay between the computing device and a server, such as a corresponding online game server. For example, the network delay can be the network delay between an online game client running on the computing device and the corresponding online game server of the game. The preset threshold can be set by the server or the user of the computing device. The preset threshold can also be set as the sum of a preset value and a normal network delay between the computing device and the server which is buffered by the computing device. For example, if the normal network delay between the computing device and the server buffered by the computing device is 60 ms and the preset value is 50 ms, the preset threshold would be set as 110 ms. And when the value of the network delay exceeds the preset threshold, the following steps would be performed.

In block S320, the computing device closes at least one network acceleration software among all the network acceleration software installed. Specifically, after the network acceleration settings are backed up, one or more network acceleration software in the network acceleration software list can be closed according to the network acceleration settings. For example, the network acceleration software list may include software A, B and C. In this example, the computing device can close software A or software B or software C individually, or the computing device can close any combination of the network acceleration software, such as software A+B or software A+C or software B+C or software A+B+C.

In block S330, the computing device judges again whether the value of the network delay exceeds the preset threshold after the at least one network acceleration software is closed. And proceed to block S340 if the value of the network delay does not exceed the preset threshold after the at least one network acceleration software is closed.

In block S340, the computing device determines that the at least one network acceleration software closed is at question. Specifically, because before the at least one network acceleration software is closed, the value of the network delay exceeded the preset threshold; and after the at least one network acceleration software is closed, the value of the network delay became smaller than the preset threshold, it can be determined that the at least one network acceleration software closed is at question. That is, the at least one network acceleration software closed is bad or malicious software which slows down the speed of the network. Further, the computing device for managing the network acceleration software can notify the user that the at least one network acceleration software is at question and ask the user whether to delete the at least one network acceleration software.

According to an example of the present disclosure, the method for managing the network acceleration software may further include the step that, the computing device backs up network acceleration settings. The network acceleration settings include a network acceleration software list recording all the network acceleration software installed on the computing device. Specifically, the content backed-up may include time of the backup operation and network acceleration software installed at the time of the backup operation. In the backup operation, the network acceleration software installed may be identified by its software ID, such as signature and/or path of the network acceleration software. After the backup operation, a network acceleration software list recording all network acceleration software installed would be saved. Thus the computing device for managing the network acceleration software may restore the network acceleration settings of a previous moment according to the requirement of the user in the future.

According to an example of the present disclosure, the method for managing the network acceleration software may further include the step that the computing device restores the backed up network acceleration settings. Specifically, if the value of the network delay still exceeds the preset threshold even after the at least one network acceleration software is closed, it means that the at least one network acceleration software itself is not the reason of the big network delay, therefore the backed-up network acceleration settings can be restored.

Alternatively, even when it is determined that the at least one network acceleration software is at question, the computing device may also restore the backed-up network acceleration settings. That is, each time after one or more network acceleration software is closed, no matter whether the value of the network delay exceeds the preset threshold or not, the backed-up network acceleration settings can be restored so as to check all the network acceleration software individually. That is, after the backed-up network acceleration settings in is restored, the computing device may return to S320 to close other network acceleration software in the network acceleration software list to check whether the network acceleration software closed is at question or not.

According to an example of the present disclosure, the computing device may close at least one network acceleration software among all the network acceleration software installed by the following steps:

The computing device compares current network accelerating settings with the backed-up network acceleration settings adopting which the value of the network delay did not exceed the preset threshold to find newly installed network acceleration software which is installed after the backed up network acceleration settings were backed up, and then closes at least one of the newly installed network acceleration software. For example, the backed-up previous network acceleration settings show that when only network acceleration software A and B are installed, the value of the network delay at that time does not exceed the preset threshold. But now the current network acceleration software installed includes network acceleration software A, B, C and D, and the value of the network delay exceeds the preset threshold. In this case, the network acceleration software A or B individually, or the combination of network acceleration software A+B can be closed first to check whether the newly installed network acceleration software is at question. And only after determining that all the newly installed network acceleration software is not at question, the other network acceleration software would be checked.

Figure 4:
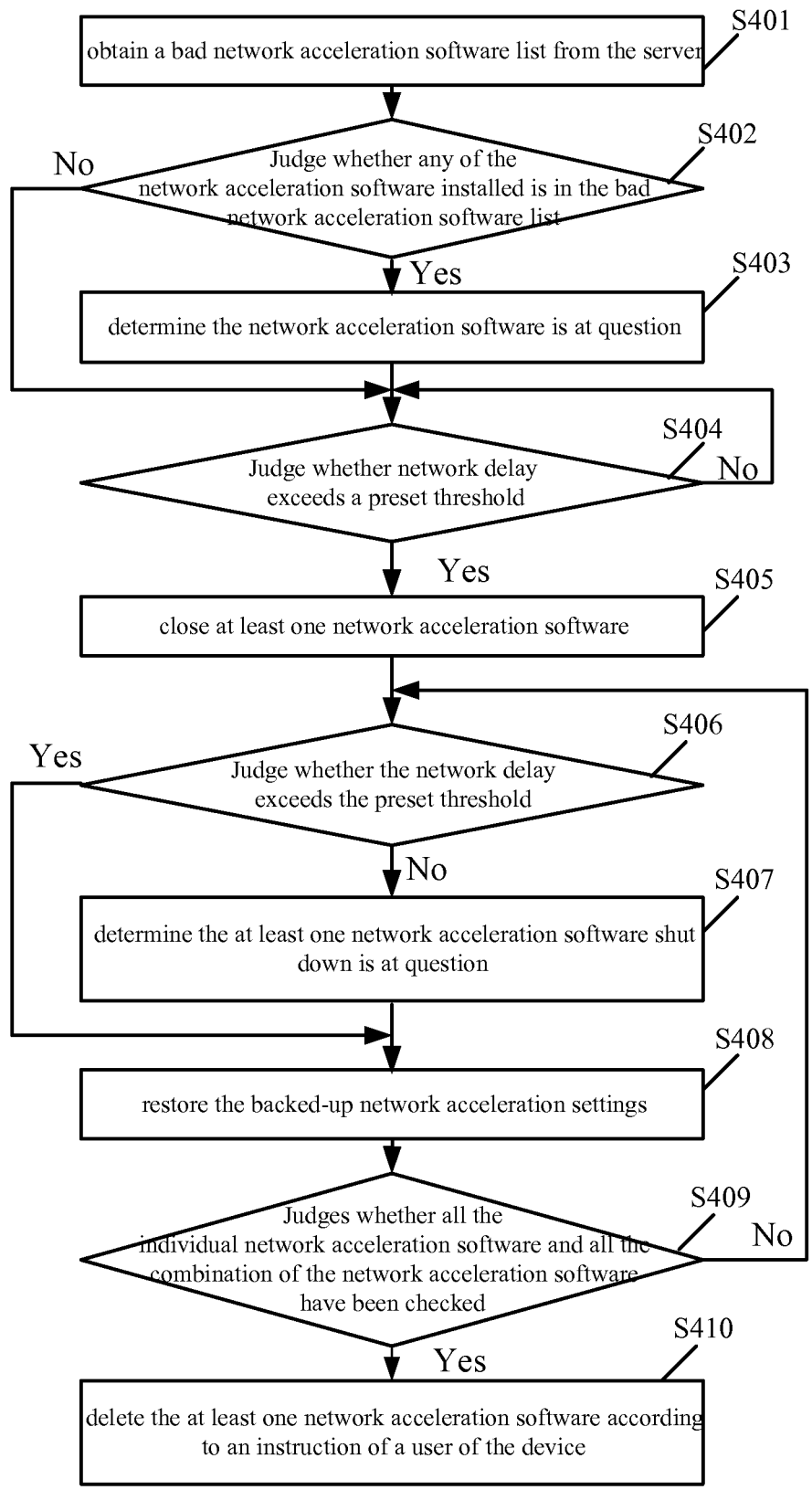
FIG. 4 is a flow chart illustrating the process of a method for managing network acceleration software according to another example of the present disclosure.

FIG. 4 is a flowchart illustrating the process of a method for managing the network acceleration software according to another example of the present disclosure. As illustrated in FIG. 4, the method includes the following steps.

In block S401, the computing device obtains a bad network acceleration software list from the server. Specifically, the bad network acceleration software list may be pushed by the server in different network segment and in different times. And the bad network acceleration software list records the software IDs (such as the signature or the path of the network acceleration software) of a plurality of network acceleration software.

In block S402, the computing device judges whether any of the network acceleration software installed is in the bad network acceleration software list. Specifically, the computing device for managing the network acceleration software can match each of the network acceleration software installed with the bad network acceleration software list obtained from the server to check if the signature and/or the path of any of the network acceleration software installed is in the bad network acceleration software list. If the signature and or the path of one of the network acceleration software installed is in the bad network acceleration software list, proceed to S403; otherwise, jump to S404.

In block S403, if one of the network acceleration software is in the bad network acceleration software list, the computing device determines the network acceleration software is at question. And if one of the network acceleration software is considered to be at question, the computing device may close the network acceleration software.

In block S404, the computing device obtains a value of network delay and judges whether the value of the network delay exceeds a preset threshold. And if the value of the network delay exceeds the preset threshold, the following steps are performed.

In block S405, the computing device closes at least one network acceleration software if the value of the network delay exceeds the preset threshold.

In block S406, the computing device judges again whether the value of the network delay still exceeds the preset threshold. If the value of the network delay does not exceed the preset threshold, proceed to block S407.

In block S407, the computing device determines the at least one network acceleration software closed is at question.

According to an example, the method for managing network acceleration software may further include that the computing device backs up network acceleration settings. As stated above, the network acceleration settings include a network acceleration software list recording all network acceleration software installed on the computing device.

In block S408, the computing device restores the backed-up network acceleration settings. According to an example of the present disclosure, after closing the at least one network acceleration software, the computing device would restore the backed-up network acceleration settings no matter whether the value of the network delay exceeds the preset threshold or not, so as to check all the network acceleration software installed individually.

In block S409, the computing device judges whether all the individual network acceleration software and all the combination of the network acceleration software have been checked. If all the individual network acceleration software and all the combination of the network acceleration software have been checked, proceed to S410; otherwise, return to S405, continue to check other individual network acceleration software or other combination of network acceleration software. If no bad network acceleration software has been detected, it means that the network delay may have nothing to do with the network acceleration software installed. And the above process is over.

In block S411, the computing device deletes the at least one network acceleration software according to an instruction of a user of the computing device. Specifically, after the computing device has checked all the network acceleration software individually and in any combination form, the computing device would notify the user of all the bad network acceleration software, and ask the user whether to delete the bad network acceleration software. And additionally, before deleting the bad network acceleration software according to the instruction of the user, the computing device may further back up the network acceleration settings which enable the computing device to restore the backed-up network acceleration settings in the future.

According to the above description of the present disclosure, the computing device can find bad or malicious network acceleration software which slows down the speed of the network by comparing the value of the network delay with a preset threshold before and after closing at least one network acceleration software. By adopting the above computing device and method, bad or malicious network acceleration software can be found quickly and no good network acceleration software would be deleted by mistake.

Figure 5:
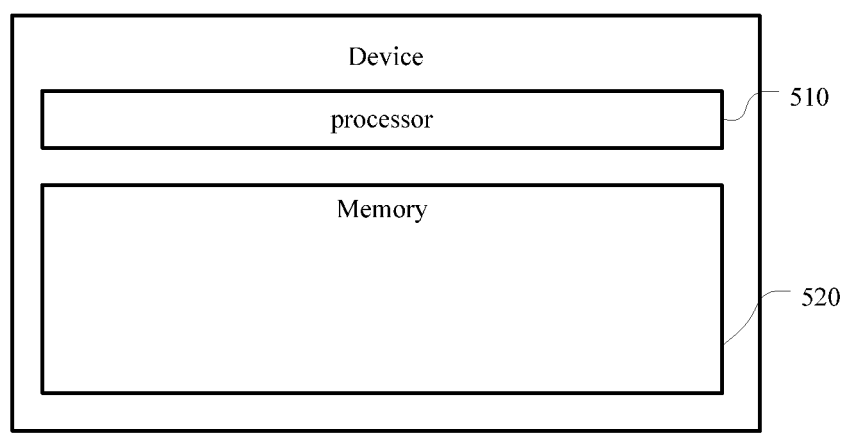
FIG. 5 is a schematic diagram illustrating a structure of a computing device for managing network acceleration software according to another example of the present disclosure.

FIG. 5 is a schematic diagram illustrating a structure of a computing device for managing network acceleration software according to another example of the present disclosure. As shown in FIG. 5, the computing device includes one or more processors 510 and a memory 520. The memory 520 includes one or more programs executed by the one or more processors 510, the one or more programs include instructions to: obtain a value of network delay of the computing device; determine whether the value of the network delay exceeds a preset threshold; close at least one network acceleration software if the value of the network delay exceeds the preset threshold and determining the at least one network acceleration software is at question if the value of the network delay does not exceed the preset threshold after the at least one network acceleration software is closed.

According to an example of the present disclosure, the one or more programs may further include instructions to back up network acceleration settings before the at least one network acceleration software is closed; wherein the network acceleration settings record all network acceleration software installed.

And the one or more programs may further include instructions to restore the backed up network acceleration settings if the value of the network delay exceeds the preset threshold after the at least one network acceleration software is closed.

Specifically, the one or more programs may further include instructions to restore the backed up network acceleration settings if the value of the network delay does not exceed the preset threshold after the at least one network acceleration software is closed.

According to another example of the present disclosure, the one or more programs may further include instructions to delete the at least one network acceleration software which is determined to be at question according to an instruction from a user.

According to another example of the present disclosure, the one or more programs may further include instructions to obtain a bad network acceleration software list from a server; and to determine one of network acceleration software installed is at question if the network acceleration software installed is in the bad network acceleration software list.

In one embodiment, the memory, which includes the one or more program, may be a non-transitory computer-readable storage medium. The non-transitory computer-readable storage medium may include a set of instructions for managing network acceleration software, the set of instructions to direct at least one processor to perform acts of the above described method for managing network acceleration software.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure.

What is claimed is:

1. A method for managing network acceleration software performed by a processor by executing instructions stored in a memory, wherein the processor and memory are comprised in a computing device, comprising:
   obtaining a value of network delay of the computing device, and determining whether the value of the network delay exceeds a preset threshold;
   backing up network acceleration settings, upon the condition that the value of network delay exceeds the preset threshold, the network acceleration settings comprising a network acceleration software list recording all network acceleration software installed in the computing device;
   closing at least one network acceleration software; and
   determining that the at least one network acceleration software is at question if the value of the network delay does not exceed the preset threshold after the at least one network acceleration software is closed.

2. The method according to claim 1, further comprising:
   restoring the backed-up network acceleration settings if the value of the network delay exceeds the preset threshold after the at least one network acceleration software is closed.

3. The method according to claim 1, further comprising:
restoring the backed-up network acceleration settings if the value of the network delay does not exceed the preset threshold after the at least one network acceleration software is closed.

4. The method according to claim 1, wherein closing at least one network acceleration software comprises:
comparing current network accelerating settings with the backed up network acceleration settings by adopting which the value of the network delay did not exceed the preset threshold;
finding newly installed network acceleration software after the backed up network acceleration settings were backed up; and
closing at least one of the newly installed network acceleration software.

5. The method according to claim 1, further comprising:
deleting the at least one network acceleration software which is determined to be at question according to an instruction from a user.

6. The method according to claim 1, further comprising:
obtaining a bad network acceleration software list from a server;
determining one of network acceleration software installed in the computing device is at question if the network acceleration software installed is in the bad network acceleration software list.

7. The method according to claim 1, wherein the network delay comprises network delay between the computing device and a server.

8. A computing device for managing network acceleration software, comprising:
one or more processors;
a memory; and
one or more programs stored in the memory and to be executed by the one or more processors, the one or more programs comprise instructions to:
obtain a value of network delay of the computing device, determine whether the value of network delay exceeds a preset threshold;
back up network acceleration settings, upon the condition that the value of network delay exceeds the preset threshold, the network acceleration settings recording all network acceleration software installed;
close at least one network acceleration software; and
determine the at least one network acceleration software is at question if the value of the network delay does not exceed the preset threshold after the at least one network acceleration software is closed.

9. The computing device according to claim 8, wherein the one or more programs further comprise instructions to:
restore the backed up network acceleration settings if the value of the network delay exceeds the preset threshold after the at least one network acceleration software is closed.

10. The computing device according to claim 8, wherein the one or more programs further comprise instructions to:
restore the backed up network acceleration settings if the value of the network delay does not exceed the preset threshold after the at least one network acceleration software is closed.

11. The computing device according to claim 8, wherein the one or more programs further comprise instructions to:
delete the at least one network acceleration software which is determined to be at question according to an instruction from a user.

12. The computing device according to claim 8 wherein the one or more programs further comprise instructions to:
obtain a bad network acceleration software list from a server;
determine one of network acceleration software installed is at question if the network acceleration software installed is in the bad network acceleration software list.

13. A non-transitory computer-readable storage medium comprising a set of instructions for managing network acceleration software, the set of instructions to direct at least one processor to perform acts of:
obtaining a value of network delay of the computing device and determining whether the value of the network delay exceeds a preset threshold;
backing up network acceleration settings, upon the condition that the value of network delay exceeds the preset threshold, the network acceleration settings comprising a network acceleration software list recording all network acceleration software installed in the computing device;
closing at least one network acceleration software; and
determining that the at least one network acceleration software is at question if the value of the network delay does not exceed the preset threshold after the at least one network acceleration software is closed.

* * * * *